US010933780B2

(12) United States Patent
Rappl et al.

(10) Patent No.: US 10,933,780 B2
(45) Date of Patent: Mar. 2, 2021

(54) DEVICE FOR CONTROLLING THE TEMPERATURE OF THE NECK REGION OF A USER OF A VEHICLE SEAT

(71) Applicant: GENTHERM GMBH, Odelzhausen (DE)

(72) Inventors: Alexander Rappl, Königsbrunn (DE); Jochen Pfaff, Eching/Dietersheim (DE)

(73) Assignee: GENTHERM GMBH, Odelzhausen (DE)

( * ) Notice: Subject to any disclaimer, the term of this patent is extended or adjusted under 35 U.S.C. 154(b) by 268 days.

(21) Appl. No.: 16/072,349

(22) PCT Filed: Feb. 10, 2017

(86) PCT No.: PCT/DE2017/000023
§ 371 (c)(1),
(2) Date: Jul. 24, 2018

(87) PCT Pub. No.: WO2017/137023
PCT Pub. Date: Aug. 17, 2017

(65) Prior Publication Data
US 2019/0031060 A1    Jan. 31, 2019

(30) Foreign Application Priority Data

Feb. 10, 2016    (DE) .................. 10 2016 001 426

(51) Int. Cl.
*B60L 1/02* (2006.01)
*B60N 2/56* (2006.01)
(Continued)

(52) U.S. Cl.
CPC ....... *B60N 2/5671* (2013.01); *B60H 1/00285* (2013.01); *B60H 1/00407* (2013.01);
(Continued)

(58) Field of Classification Search
CPC ...... B60N 2/56; B60N 2/5621; B60N 2/5628; B60N 2/5635; B60N 2/5642;
(Continued)

(56) References Cited

U.S. PATENT DOCUMENTS 2,738,593 A    3/1956   June
3,101,660 A    8/1963   Taylor
(Continued)

FOREIGN PATENT DOCUMENTS

CN    203063735 U    7/2013
CN    103303096 A    9/2013
(Continued)

OTHER PUBLICATIONS

International Search Report from the European Patent Office for Application No. PCT/DE2017/000023 dated Jul. 10, 2017.
(Continued)

*Primary Examiner* — Hung D Nguyen
(74) *Attorney, Agent, or Firm* — The Dobrusin Law Firm, P.C

(57) ABSTRACT

A device for controlling the temperature of the neck region of a user of a vehicle seat. The device includes an air conveying device that is configured to convey air to a temperature control region, a temperature control device that is configured to control the temperature of the air to be conveyed to the temperature control region, and a control device that is configured to automatically control the air conveying device and the temperature control device.

16 Claims, 2 Drawing Sheets

Figure 1:
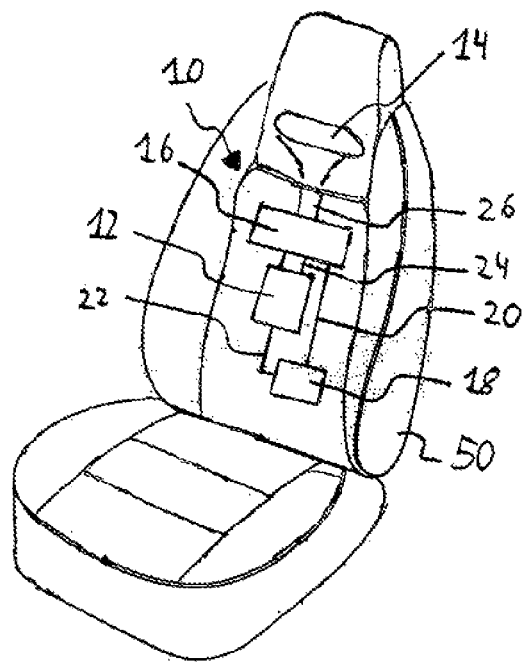

(51) Int. Cl.
*B60H 1/24* (2006.01)
*B60H 1/00* (2006.01)

(52) U.S. Cl.
CPC ..... *B60H 1/00742* (2013.01); *B60H 1/00792* (2013.01); *B60H 1/246* (2013.01); *B60N 2/5685* (2013.01)

(58) Field of Classification Search
CPC .. B60N 2/5657; B60N 2/5664; B60N 2/5671; B60N 2/5685; B60N 2/5692; B60H 1/00285; B60H 1/00407; B60H 1/00742; B60H 1/00764; B60H 1/00792; B60H 1/00821; B60H 1/2218; B60H 1/2225; B60H 1/246; B60H 1/247
USPC ......... 219/200, 202, 217; 297/180.1, 180.12, 297/180.13, 180.14
See application file for complete search history.

(56) References Cited

U.S. PATENT DOCUMENTS

| | | | |
|---|---|---|---|
| 4,092,963 | A | 6/1978 | Vrooman |
| 5,102,189 | A | 4/1992 | Saito et al. |
| 5,160,517 | A | 11/1992 | Hicks et al. |
| 5,839,774 | A | 11/1998 | Hack et al. |
| 5,921,100 | A | 7/1999 | Yoshinori et al. |
| 5,927,817 | A | 7/1999 | Ekman et al. |
| 6,059,018 | A | 5/2000 | Yoshinori et al. |
| 6,179,706 | B1 | 1/2001 | Yoshinori et al. |
| 6,196,627 | B1 | 3/2001 | Faust et al. |
| 6,321,996 | B1 | 11/2001 | Odebrecht et al. |
| 6,604,785 | B2 | 8/2003 | Bargheer et al. |
| 6,644,735 | B2 | 11/2003 | Bargheer et al. |
| 6,746,076 | B2 | 6/2004 | Bogisch et al. |
| 6,761,399 | B2 | 7/2004 | Bargheer et al. |
| 7,784,863 | B2 | 8/2010 | Fallen |
| 7,963,595 | B2 | 6/2011 | Ito et al. |
| 8,167,368 | B2 | 5/2012 | Eckel |
| 8,201,203 | B2 | 6/2012 | Vitito |
| 9,333,888 | B2 | 5/2016 | Helmenstein |
| 9,346,384 | B2 | 5/2016 | Zhang et al. |
| 2005/0238339 | A1 | 10/2005 | Bargheer et al. |
| 2008/0036249 | A1 | 2/2008 | Heckmann et al. |
| 2008/0136221 | A1* | 6/2008 | Hartmann ......... B60H 1/00821 297/180.14 |
| 2008/0290703 | A1 | 11/2008 | Bargheer et al. |
| 2008/0300749 | A1* | 12/2008 | Hartmann ............ B60N 2/5685 701/36 |
| 2009/0134677 | A1 | 5/2009 | Maly et al. |
| 2009/0192671 | A1* | 7/2009 | Bolender ............. B60N 2/5671 219/202 |
| 2011/0101741 | A1 | 5/2011 | Kolich |
| 2011/0115263 | A1 | 5/2011 | Bargheer et al. |
| 2012/0153701 | A1 | 6/2012 | Lin |
| 2013/0043320 | A1 | 2/2013 | Zhang et al. |
| 2013/0232996 | A1 | 9/2013 | Goenka et al. |
| 2013/0300179 | A1 | 11/2013 | Ota |
| 2014/0152057 | A1 | 6/2014 | Truant et al. |
| 2014/0159442 | A1 | 6/2014 | Helmenstein |
| 2015/0183348 | A1 | 7/2015 | Zhang et al. |
| 2016/0214514 | A1 | 7/2016 | Helmenstein |
| 2016/0236599 | A1* | 8/2016 | Nordalm ............. B60N 2/5685 |

FOREIGN PATENT DOCUMENTS

| | | |
|---|---|---|
| CN | 104969138 A | 10/2015 |
| DE | 19824191 A1 | 12/1998 |
| DE | 19830797 A1 | 1/1999 |
| DE | 19927232 A1 | 12/1999 |
| DE | 19949935 C1 | 11/2000 |
| DE | 10047754 A1 | 4/2002 |
| DE | 102004030705 B3 | 12/2005 |
| DE | 102004030707 A1 | 1/2006 |
| DE | 102013221516 A1 | 4/2015 |
| EP | 0217752 A2 | 4/1987 |
| EP | 1075984 B1 | 5/2003 |
| EP | 2082920 A1 | 7/2009 |
| JP | 2005253490 A | 9/2005 |
| JP | 2005532095 A | 10/2005 |
| JP | 2013-184588 A | 9/2013 |

OTHER PUBLICATIONS

Potentially related U.S. Appl. No. 15/091,081, filed Apr. 5, 2016, published as US2016/0214514A1 on Jul. 28, 2016.
Japanese Decision to Grant for Japanese Application 2018-539872, dated Jan. 30, 2020.
Japanese Written Opinion for Japanese Application 2018-539872, dated Dec. 25, 2019.
Chinese First Search for Chinese Application 2017800074952, dated Jul. 20, 2018.

* cited by examiner

DEVICE FOR CONTROLLING THE TEMPERATURE OF THE NECK REGION OF A USER OF A VEHICLE SEAT

The invention relates to a device for controlling the temperature of the neck region of a user of a vehicle seat, said device comprising an air conveying device, which is configured to convey air to a temperature control region, and a temperature control device, which is configured to control the temperature of the air to be conveyed to the temperature control region.

The invention further relates to a vehicle seat including a device for controlling the temperature of the neck region of a user, and a control method for operating a device for controlling the temperature of the neck region of a user of a vehicle seat, comprising the following steps: conveying air to a temperature control region by means of an air conveying device, and controlling the temperature of the air to be conveyed to the temperature control region, by means of a temperature control device.

Devices of this type are used in convertible vehicles, in particular, to prevent the neck region of the vehicle driver, and of other vehicle occupants where appropriate, from being cooled excessively. This measure helps to prevent muscular tension in the neck region, and to avoid diseases brought on by the cold airflow produced by driving. In addition, controlling the temperature of the neck region substantially increases the level of comfort within the vehicle.

It has been found, however, that the operating mode of the employed air conveying device and the operating mode of the employed temperature control device often are not coordinated, and therefore, controlling the temperature in the neck region temporarily reduces the level of comfort for the user of the vehicle seat. This reduced comfort level may be caused, for example, by an unsuitable air temperature, unsuitable air flow, and/or excessive noise generation.

The object of the invention is therefore to further increase the level of comfort provided by a neck temperature control device, by coordinating the operation of the air conveying device with the operation of the temperature control device.

The object is achieved by a device of the aforementioned type, with the device according to the invention including a control device, configured to control the air conveying device and the temperature control device automatically.

The invention makes use of the discovery that the operation of the air conveying device and the operation of the temperature control device can be coordinated by the automatic control of the air conveying device and the temperature control device by the control device. This enables the generation of an unsuitable temperature in the temperature control region and the adjustment to an air flow that is unpleasant for the user of the vehicle seat to be effectively avoided. In addition, the automatic control of the air conveying device and the temperature control device enables excessive noise generation to be avoided. The temperature control device may comprise, for example, a heating device and/or a cooling device for heating and/or cooling the air to be conveyed to the temperature control region. In particular, the air conveying device may comprise a fan, preferably a centrifugal fan. The device for controlling the temperature of the neck region of a user of a vehicle seat can thus be embodied, for example, as a heating and/or cooling fan.

In a preferred embodiment of the device according to the invention, the control device is configured to automatically adjust to a preheat operating mode, in which the air conveying device is deactivated and the temperature control device is activated. Because the air conveying device is deactivated in the preheat operating mode, the conveyance to the temperature control region of air that has not been temperature controlled or has not been adequately temperature controlled is effectively prevented. An uncomfortable temperature sensation for the user of the vehicle seat is thereby avoided. In addition, strong current peaks upon switching the device on are avoided, since the deactivated air conveying device results in a reduced power requirement. The temperature control device preferably delivers at least 50% of its output required for a specific power setting during the preheat operating mode. For the purposes of the invention, an activated device is understood as a device that is switched on, and therefore, an activated device may also be operated in clocked mode and with pulse-width modulation.

Additionally, the device according to the invention is advantageously refined in that the control device is configured to adjust to the preheat operating mode upon activation of the device and/or when the ambient temperature is below a temperature threshold. For this purpose, the device may include one or more temperature sensors, for example. Particularly when ambient temperatures are low, blown air that has not been preheated may be perceived as unpleasant by the user of the vehicle seat. By preheating the air to be delivered, the temperature-controlling effect of the device is perceived immediately as pleasant. The preheat operating mode thus ensures, for example, that the cold air present in the device or in the seat is first preheated before the air conveying device is placed in operation by a delayed start-up of the fan.

In another embodiment of the device according to the invention, the control device is configured to maintain the preheat operating mode for a preheating period and/or until a predefined difference between the ambient temperature and the air temperature of the temperature-controlled air is reached. The preheating period may range, for example, from 0 seconds to 45 seconds, preferably from 0 seconds to 2 seconds, particularly preferably from 0.5 seconds to 2 seconds. The preheat operating mode may be executed, for example, until the air temperature of the temperature-controlled air is approximately 10° C. above the ambient temperature.

In a particularly preferred embodiment of the device according to the invention, the control device is configured to determine the duration of the preheating period on the basis of one or more ambient parameters and/or one or more operating parameters of the temperature control device. In this exemplary embodiment, therefore, the duration of the preheating period is not a static preselected time value and is instead dependent on the environment and/or the operation of the temperature control device. The one or more ambient parameters may include, for example, the ambient temperature and/or the humidity level in the environment. The one or more operating parameters of the temperature control device may include, for example, the power consumption, the current consumption, the applied voltage, and/or the electrical resistance of the temperature control device or its components. When the vehicle roof is closed, the term "environment" typically refers to the interior of the vehicle cabin and the air inside the vehicle cabin. In this case, e.g. "ambient temperature" refers to the temperature of the air inside the vehicle cabin in the vicinity of the component in question. However, depending on the configuration, "environment" may also mean the space outside the vehicle cabin. This is the case, in particular, with vehicles that are operated with the top down. In that case, e.g. "ambient temperature" means the temperature of the air outside the vehicle.

In a refinement of the device according to the invention, the temperature control device comprises one or more PTC heating resistors or is composed of one or more PTC heating resistors. The control device is preferably configured to determine the duration of the preheating period on the basis of the resistance value of the one or more PTC heating resistors. The resistance value of a PTC heating resistor is dependent upon its temperature. The preheat operating mode is preferably executed until a resistance value that can be associated with a PTC heating resistor temperature greater than 30° C. is detected.

In another preferred embodiment of the device according to the invention, the control device is configured to determine the duration of the preheating period on the basis of the gradient of the resistance value of the one or more PTC heating resistors. Factoring in the gradient of the resistance value enables the time of maximum current consumption by the device to be reduced. It is preferable, in particular, for the preheat operating mode to be executed until both the resistance value and the gradient of the resistance value are within a defined range.

To avoid over-adjusting the temperature of the air during the preheat operating mode when a start-up process is repeated, the span of time between two start-up processes, during which time the device was deactivated, may be compared with the amount of time required for the one or more PTC heating resistors to cool down. If the amount of time during which the device was deactivated is shorter than the amount of time required for the one or more PTC heating resistors to cool down, the preheat operating mode will be suppressed, shortened or operated at a reduced power level.

The control device of the device according to the invention is preferably configured to automatically adjust to a start-up operating mode, in which the air conveying device and the temperature control device are activated and the operating state of the air conveying device and/or the operating state of the temperature control device change(s) at least temporarily. The start-up operating mode allows the air conveyance rate to be adjusted to the currently prevailing temperature control output of the temperature control device. For example, in the start-up operating mode it can be ensured, by appropriately controlling the air conveying device or by appropriately adjusting the fluid conveyance rate, that no more air is conveyed than can be heated by the as yet only partially heated heating fan, or by a heating resistor that has yet to reach the target temperature. In the start-up operating mode, the temperature control device preferably delivers at least 50% of its output required for a specific power setting.

In a particularly preferred embodiment of the device according to the invention, the control device is configured to adjust an electrical parameter that influences the conveyance rate of the air conveying device and/or to change the fluid flow during the start-up operating mode. Said electrical parameter may be, for example, the amount of voltage applied, the power consumption during a certain time period, the average duty cycle in the case of pulse-width-modulated operation, or the current intensity flowing through. The fluid flow may be adjusted, for example, by adjusting the electric power consumption of the conveying device, by adjusting the volume of fluid conveyed or the fluid volume flow rate, or by adjusting the rotational speed of a fan of the air conveying device. The maximum flow of current through the air conveying device and/or the temperature control device during the preheat operating mode and/or the start-up operating mode is preferably within a range of 16 to 25 A at 12 volts, preferably 16 to 20 A, or 4 to 5 A at 48 volts.

In a refinement of the device according to the invention, the influencing electrical parameter and/or the fluid flow is/are changed by increasing the influencing electrical parameter and/or the fluid flow from an initial value to a setpoint value, preferably over a start-up time period. The start-up period preferably ranges from 0 seconds to 40 seconds, preferably from 1 second to 20 seconds, particularly preferably from 1.5 seconds to 2 seconds. The influencing electrical parameter and/or the fluid flow may be increased continuously and/or in stages.

In a further preferred embodiment of the device according to the invention, the control device is configured to increase the influencing electrical parameter and/or the fluid flow linearly, hyperbolically or asymptotically, at least in stages. Preferably, the control device is configured to increase the influencing electrical parameter and/or the fluid flow along a linear ramp or hyperbolic ramp, at least in stages. Each of the various rates of increase of the influencing electrical parameter and/or the fluid flow may be advantageous under selected operating conditions, for example to achieve maximum comfort for the user of the vehicle seat or to accelerate air temperature control.

Further preferred is a device according to the invention in which the control device is configured to increase the influencing electrical parameter and/or the fluid flow based upon one or more ambient parameters, the temperature in the temperature control region and/or one or more operating parameters of the temperature control device. The one or more ambient parameters may include the ambient temperature, for example. By increasing the influencing electrical parameter and/or the fluid flow based upon the temperature in the temperature control region, it can be ensured, through appropriate control, that the same temperature always prevails in the temperature control region during the start-up operating mode. This leads to a substantial increase in comfort for the user of the vehicle seat.

In a particularly preferred embodiment of the device according to the invention, the control device is configured to increase the influencing electrical parameter and/or the fluid flow based upon the resistance value of the one or more PTC heating resistors and/or based upon the gradient of the resistance value of the one or more PTC heating resistors. The fluid delivery volume of the air conveying device is preferably recorded for each resistance value of the one or more PTC heating resistors during the start-up mode. The fluid delivery volume thus increases as a function of the PTC resistance, so that during the start-up operating mode, the fluid flow always has the same temperature.

In another preferred embodiment of the device according to the invention, the control device is configured to maintain a target resistance value of the one or more PTC heating resistors once this target resistance value is reached. In this way, perceptible noise level changes are avoided, thereby increasing user comfort.

Also preferred is a device according to the invention in which the control device is configured to automatically adjust to a continuous operating mode. In this continuous operating mode, the air conveying device and the temperature control device are operated substantially constantly in a desired state. The temperature control device preferably delivers at least 50% of its output required for a specific power setting in this mode. In particular, the control device increases at least one influencing electrical parameter to a final value. In this context, final value means, in particular, a value that corresponds to a setpoint value suitable for continuous operation. This final value is preferably maintained with a maximum deviation of +/−20%. In other words, it deviates by a maximum of +/−20% from the intended target value. The influencing electrical parameter is preferably a parameter that influences the conveyance rate of the air conveying device.

The control device is preferably configured to adjust to the preheat operating mode first, before adjusting to the start-up operating mode. In addition, the device is preferably operated in the start-up operating mode first, before the continuous operating mode is set. In the continuous operating mode, the device is preferably in a steady state, so that the continuous operating mode can be executed without a final time limit.

The object of the invention is further achieved by a headrest or a vehicle seat of the type set out in the introductory part, in which the device for controlling the temperature of the neck region of the user is configured according to any one of the above-described embodiments. The headrest and/or the vehicle seat may thus include, for example, a heater fan for blowing cold and/or warm air toward the neck region of a passenger. Regarding further advantages and modifications of the vehicle seat according to the invention, reference is made to the advantages and modifications of the device according to the invention.

The object of the invention is further achieved by a control method of the type set out in the introductory part, in which the air-conveying device and the temperature control device are controlled automatically by means of a control device. In particular, the control method according to the invention is used for operating a device for controlling the temperature of the neck region of a user of a vehicle seat, according to any one of the embodiments described above.

In a preferred embodiment, the control method according to the invention comprises the automatic adjustment by the control device to a preheat operating mode, in which the air conveying device is deactivated and the temperature control device is activated, the automatic adjustment by the control device to a start-up operating mode, in which the air conveying device and the temperature control device are activated and the operating state of the air conveying device and/or the operating state of the temperature control device change(s) at least temporarily, and/or the automatic adjustment by the control device to a continuous operating mode, in which the air conveying device and the temperature control device are operated substantially constantly in a desired state.

In an advantageous refinement of the control method according to the invention, the device is activated and detects the ambient temperature, and once the device is activated and/or if the ambient temperature is below a temperature threshold, the preheat operating mode is set. Particularly when ambient temperatures are low, blown air that has not been preheated may be perceived as unpleasant by the user of the vehicle seat. By preheating the air to be delivered, the temperature controlling effect of the device is perceived immediately as pleasant.

In addition, in a preferred control method according to the invention, the duration of the preheating period is determined and/or the operating mode changes automatically from the preheat operating mode to the start-up operating mode once the preheating period has elapsed. By switching automatically from the preheat operating mode to the start-up operating mode, no user intervention is required once the temperature control in the preheat operating mode has been completed. The comfort level is thus further increased.

In another advantageous embodiment of the control method according to the invention, the duration of the preheating period is determined on the basis of one or more ambient parameters and/or one or more operating parameters of the temperature control device. Further preferred is a control method according to the invention in which the determination of the duration of the preheating period comprises detecting a resistance value of one or more PTC heating resistors of the temperature control device and/or detecting a gradient of the resistance value of one or more PTC heating resistors of the temperature control device, wherein the duration of the preheating period is determined based upon the detected resistance value and/or the detected gradient of the resistance value of the one or more PTC heating resistors. Factoring in the gradient of the resistance value enables the time of maximum current consumption by the device to be reduced. It is preferable, in particular, for the preheat operating mode to be executed until both the resistance value and the gradient of the resistance value are within a defined range.

In a further embodiment of the control method according to the invention, an electrical parameter that influences the conveyance rate of the air conveying device and/or the fluid flow is/are changed in the start-up operating mode, the influencing electrical parameter and/or the fluid flow is/are increased from an initial value to a setpoint value, preferably over a start-up time period, the influencing electrical parameter and/or the fluid flow is/are increased linearly, hyperbolically or asymptotically, at least in stages, and/or the influencing electrical parameter and/or the fluid flow is/are increased based upon one or more ambient parameters, the temperature in the temperature control region, and/or one or more operating parameters of the temperature control device. Preferably, the influencing electrical parameter and/or the fluid flow is/are increased along a linear ramp or a hyperbolic ramp, at least in stages. Each of the various rates of increase of the influencing electrical parameter and/or the fluid flow may be advantageous under selected operating conditions, for example to achieve maximum comfort for the user of the vehicle seat or to accelerate air temperature control.

In the control method according to the invention, one or more ambient parameters, the temperature in the temperature control region, and/or one or more operating parameters of the temperature control device are preferably detected in the start-up operating mode. The duration of the preheating period is preferably not a static, preselected time value. The one or more ambient parameters may include, for example, the ambient temperature and/or the humidity level in the environment. The one or more operating parameters of the temperature control device may include, for example, the power consumption, the current consumption, the applied voltage, and/or the electrical resistance of the temperature control device or its components.

In a preferred refinement of the control method according to the invention, the detection of the one or more operating parameters of the temperature control device comprises the detection of a resistance value of one or more PTC heating resistors of the temperature control device, and/or the detection of a gradient of the resistance value of one or more PTC heating resistors of the temperature control device, with the influencing electrical parameter and/or the fluid flow being increased based upon the detected resistance value and/or the detected gradient of the resistance value. The method of the invention may further comprise maintaining a target resistance value of the one or more PTC heating resistors once this target resistance value has been reached.

Regarding further advantages and modifications of the control method according to the invention, reference is made to the advantages and modifications of the device according to the invention. In the foregoing, the indefinite article "a/an" is intended to mean "at least one, or a plurality of".

Figure 2:
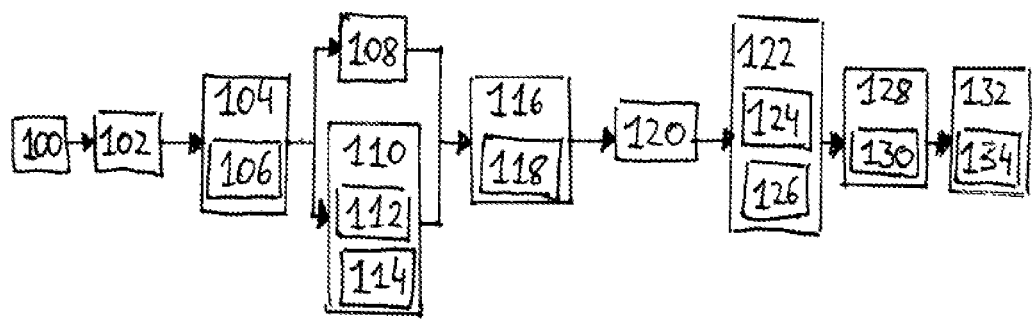
Figure 3:
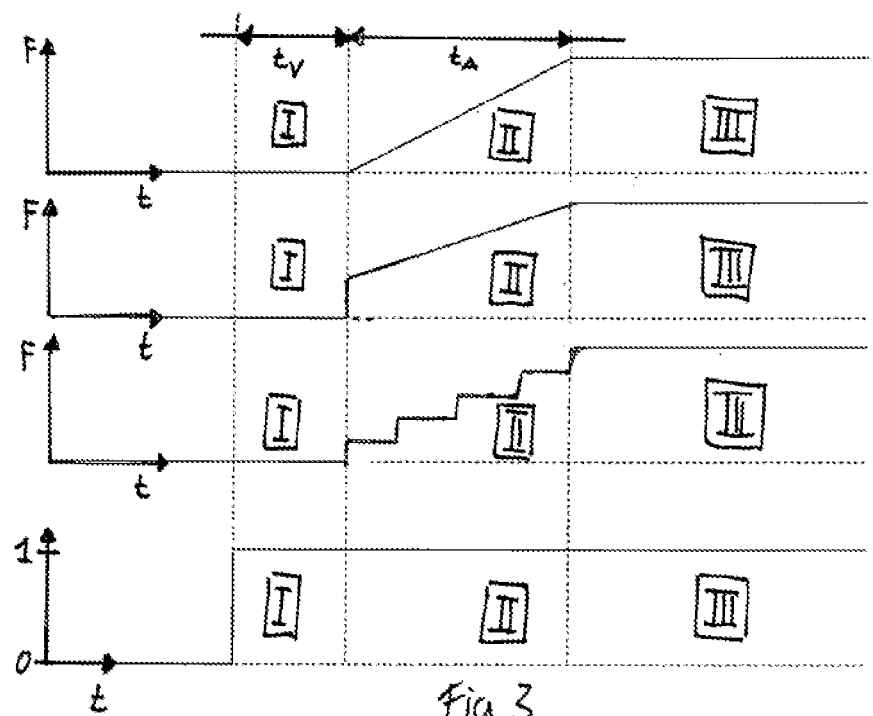
Figure 4:
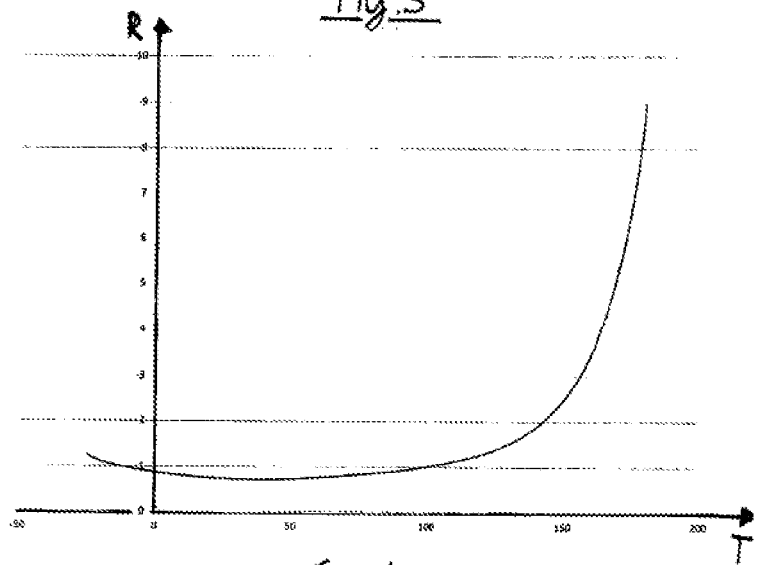

In the following, preferred embodiments of the invention will be detailed and described in reference to the accompanying drawings. Shown are:

FIG. 1 a schematic diagram of an exemplary embodiment of the vehicle seat of the invention;

FIG. 2 an exemplary embodiment of the control method of the invention, in the form of a block diagram;

FIG. 3 operating parameters of an air conveying device and a temperature control device during implementation of the method of the invention; and FIG. 4 a curve illustrating the progression of the resistance value of a PTC heating resistor of a temperature control device.

FIG. 1 shows a vehicle seat 50 equipped with a device 10 for controlling the temperature of the neck region of a user. The device 10 comprises an air conveying device 12, a temperature control device 16 and a control device 18.

Air conveying device 12 is configured to convey air to a temperature control region 14. For this purpose, air is sucked in from the area surrounding vehicle seat 50 by means of a fan, and is transported via fluid-conducting connections 24, 26 to temperature control region 14. In the neck region of the headrest of vehicle seat 50 is an outlet opening, through which the air is blown out of the fluid-conducting connections 24, 26 and into temperature control region 14.

Temperature control device 16 is configured to control the temperature of the air to be conveyed to temperature control region 14. For this purpose, temperature control device 16 is equipped with a PTC heating resistor which, when supplied with current, heats the air in the vicinity of the PTC heating resistor.

Control device 18 is configured to control air conveying device 12 and temperature control device 16 automatically. For this purpose, control device 18 is connected in a signal-conducting manner to air conveying device 12 and to temperature control device 16 via signal-conducting connections 20, 22.

Control device 18 is configured to automatically adjust to a preheat operating mode I, a start-up operating mode II or a continuous operating mode III. Exemplary embodiments of preheat operating mode I, start-up operating mode II and continuous operating mode III will be described in greater detail in reference to FIG. 3.

FIG. 2 illustrates a control method for operating a device 10 for controlling the temperature of the neck region of a user of a vehicle seat 50. The control method is initiated by the following step:

100) activation of the device 10.

Once the device has been activated, for example by the user manually actuating a control device, or automatically by the start-up process of the vehicle in which vehicle seat 50 is installed, the following step is carried out:

102) detection of the ambient temperature;

The detected ambient temperature is well below a target air temperature set automatically or by the user and is also below a predefined temperature threshold. Since device 10 has been activated and the ambient temperature is below the temperature threshold, the following step is carried out:

104) automatic control of air conveying device 12 and of temperature control device 16 by means of a control device 18.

The automatic control of air conveying device 12 and of temperature control device 16 by means of control device 18 comprises the following step:

106) automatic adjustment by control device 18 to a preheat operating mode I, in which air conveying device 12 is deactivated and temperature control device 16 is activated.

Once temperature control device 16 has been activated, the following steps can be carried out:

108) control, by means of temperature control device 16, of the temperature of the air to be conveyed to temperature control region 14; and 110) determination of the duration of a preheating period $t_V$.

Determining the duration of the preheating period $t_V$ may involve, for example, determining the span of time after which preheat operating mode I will be terminated. Alternatively, determining the duration of the preheating period $t_V$ may involve identifying an operating state which, when reached, will result in termination of preheat operating mode I.

In the present case, the duration of the preheating period $t_V$ is determined on the basis of two operating parameters of temperature control device 16, specifically the resistance value R of a PTC heating resistor of temperature control device 16 and the gradient of the resistance value R of the PTC heating resistor of temperature control device 16, and therefore, determining the duration of the preheating period $t_V$ comprises the following steps:

112) detection of a resistance value R of the PTC heating resistor of temperature control device 16; and 114) detection of a gradient of the resistance value R of the PTC heating resistor of temperature control device 16.

If the resistance value R of the PTC heating resistor and/or the gradient of the resistance value R of the PTC heating resistor are within a predefined value range, the preheat operating mode is terminated and the following step is carried out:

116) automatic control of air conveying device 12 and of temperature control device 16 by means of control device 18.

In this case, the automatic control of air conveying device 12 and of temperature control device 16 by means of control device 18 comprises the following step:

118) automatic switching of the operating mode from preheat operating mode I to a start-up operating mode II once the preheating period $t_V$ has elapsed.

In start-up operating mode II, air conveying device 12 and temperature control device 16 are activated, and the operating state of air conveying device 12 changes. Since air conveying device 12 is now activated, the following step is carried out:

120) conveyance of air to a temperature control region 14 by means of air conveying device 12.

In start-up operating mode II, the following step is also carried out:

122) detection of a plurality of operating parameters of temperature control device 16.

The detection of the plurality of operating parameters of temperature control device 16 comprises the following steps:

124) detection of a resistance value R of the PTC heating resistor of temperature control device 16; and 126) detection of a gradient of the resistance value R of the PTC heating resistor of temperature control device 16.

In start-up operating mode II, the operating state of air conveying device 12 is changed such that the conveyance rate F of air conveying device 12 is increased over time, and therefore, the control method includes the following step:

128) adjustment of an electrical parameter that influences the conveyance rate F of air conveying device 12.

The adjustment of the electrical parameter that influences the conveyance rate F of air conveying device 12 comprises the following step:

130) increase of the influencing electrical parameter from an initial value to a setpoint value over a startup time period $t_A$, Here again, the influencing electrical parameter is increased based upon the resistance value R of the PTC heating resistor of temperature control device 16 and based upon the gradient of the resistance value R of the PTC heating resistor of temperature control device 16. This increase may take place linearly, hyperbolically or asymptotically, in stages, for example.

Once the electrical parameter that influences the conveyance rate F of air conveying device 12 has been increased to a target value, the following step can be carried out:

132) automatic control of air conveying device 12 and of temperature control device 16 by means of control device 18.

In this case, the automatic control of air conveying device 12 and of temperature control device 16 by means of control device 18 comprises the following step:

134) automatic adjustment by control device 18 to a continuous operating mode III, in which air conveying device 12 and temperature control device 16 are operated substantially constantly in a desired state.

FIG. 3 shows three different progressions of the conveyance rate F of an air conveying device 12, and the operating state progression of a temperature control device 16 of a device 10 according to the invention. The illustrated progressions of the conveyance rate F of air conveying device 12 can be implemented by means of a control device 18 of the device.

A control device 18 of device 10 is configured to automatically adjust to a preheat operating mode I, a start-up operating mode II and a continuous operating mode III.

Preheat operating mode I, in which air conveying device 12 is deactivated and temperature control device 16 is activated, is executed over a preheating period $t_V$. The activation of temperature control device 16 is indicated by the jump in the operating state curve from "0" to "1". During preheating period $t_V$, the conveyance rate F is equal to zero.

Start-up operating mode II, in which air conveying device 12 and temperature control device 16 are activated and the operating state of air conveying device 12 changes, is implemented over a start-up time period $t_A$.

During the start-up time period $t_A$, temperature control device 16 maintains its activated state. In the first exemplary progression of the conveyance rate F of air conveying device 12, the conveyance rate F increases steadily and continuously until a setpoint value is reached. In the second exemplary progression of the conveyance rate F of air conveying device 12, the conveyance rate F first jumps to an intermediate value and then increases steadily and continuously from the intermediate value until a setpoint value is reached. In the third exemplary progression of the conveyance rate F of air conveying device 12, the conveyance rate F increases stepwise until a setpoint value is reached.

The conveyance rate is increased by a corresponding adjustment of an electrical parameter that influences the conveyance rate F of air conveying device 12.

Once the setpoint value for the conveyance rate F of air conveying device 12 is reached, continuous operating mode III, in which air conveying device 12 and temperature control device 16 are operated substantially constantly in a desired state, is set automatically.

FIG. 4 illustrates the dependence of the resistance value R of a PTC heating resistor on the temperature T thereof. For example, the preheat operating mode may be executed until the PTC heating resistor has reached a resistance value R that can be associated with a temperature of the PTC heating resistor of more than 30° C. If the device 10 has the resistance-temperature progression of the PTC heating resistor used, a reliable conclusion regarding the temperature of the PTC heating resistor can be reached by detecting the resistance value R.

In addition, the electrical parameter of air conveying device 12 that influences the conveyance rate F can be increased dependent upon the resistance value R of the PTC heating resistor and/or dependent upon the gradient of the resistance value R of the PTC heating resistor, and control device 18 can be configured to maintain a target resistance value of the PTC heating resistor once this target resistance value has been reached.

All of the electrical components shown in FIG. 2 could also be combined in a single module. This module could be integrated as a small box measuring approximately 10×10×6 cm, for example, into the headrest or mounted between headrest and seat back.

REFERENCE SIGNS

10 device
12 air conveying device
14 temperature control region
16 temperature control device
18 control device
20 signal-conducting connection
22 signal-conducting connection
24 fluid-conducting connection
26 fluid-conducting connection
50 vehicle seat
I preheat operating mode
II start-up operating mode
III continuous operating mode
$t_V$ preheating period duration
$t_A$ start-up time period
F conveyance rate
R resistance value of a PTC heating resistor
T temperature of a PTC heating resistor
100-134 method steps

The invention claimed is:

1. A device for controlling a temperature of a neck region of a user of a vehicle seat, comprising:
   an air conveying device, which is configured to convey air to a temperature control region;
   a temperature control device, which is configured to control a temperature of the air to be conveyed to the temperature control region; and
   a control device that is configured to control the air conveying device and the temperature control device automatically;
     wherein the control device is configured to adjust to a preheat operating mode upon activation of the device and/or when an ambient temperature is below a temperature threshold; wherein in the preheat operating mode, the air conveying device is deactivated and the temperature control device is activated;

wherein the control device is configured to maintain the preheat operating mode for a duration of a preheating period and/or until a predefined difference between the ambient temperature and an air temperature of a temperature-controlled air is reached;

wherein the temperature control device comprises one or more PTC heating resistors, the control device is configured to determine the duration of the preheating period on a basis of a resistance value of the one or more PTC heating resistors.

2. The device according to claim 1, wherein the control device is configured to determine the duration of the preheating period on a basis of one or more ambient parameters and/or one or more operating parameters of the temperature control device.

3. The device according to claim 1, wherein the control device is configured to automatically adjust to a start-up operating mode, in which the air conveying device and the temperature control device are activated.

4. The device according to claim 3, wherein the control device is configured to adjust an electrical parameter that influences a conveyance rate of the air conveying device and/or to adjust a fluid flow during the start-up operating mode.

5. The device according to claim 4, wherein the electrical parameter and/or the fluid flow is/are adjusted by increasing the electrical parameter and/or the fluid flow from an initial value to a setpoint value over a start-up time period, and
wherein the control device is configured to increase the electrical parameter and/or the fluid flow linearly, hyperbolically or asymptotically, at least in stages.

6. The device according to claim 5, wherein the control device is configured to increase the electrical parameter and/or the fluid flow on a basis of one or more ambient parameters, a temperature in the temperature control region, and/or one or more operating parameters of the temperature control device.

7. The device according to claim 4, wherein the control device is configured to increase the electrical parameter and/or the fluid flow on the basis of the resistance value of the one or more PTC heating resistors and/or a gradient of the resistance value of the one or more PTC heating resistors, and
wherein the control device is configured to maintain a target resistance value for the one or more PTC heating resistors once the target resistance value is reached.

8. The device according to claim 1, wherein the control device is configured to automatically adjust to a continuous operating mode, in which the air conveying device and the temperature control device are operated substantially constantly in a desired state.

9. A headrest for a vehicle seat, comprising a device for controlling a temperature of a neck region of a user of the vehicle seat, the device comprising:
an air conveying device, which is configured to convey air to a temperature control region;
a temperature control device, which is configured to control a temperature of the air to be conveyed to the temperature control region; and
a control device that is configured to control the air conveying device and the temperature control device automatically;
wherein the control device is configured to adjust to a preheat operating mode upon activation of the device and/or when an ambient temperature is below a temperature threshold; wherein in the preheat operating mode, the air conveying device is deactivated and the temperature control device is activated;
wherein the control device is configured to maintain the preheat operating mode for a duration of a preheating period and/or until a predefined difference between the ambient temperature and an air temperature of a temperature-controlled air is reached;
wherein the temperature control device comprises one or more PTC heating resistors, the control device is configured to determine the duration of the preheating period on a basis of a resistance value of the one or more PTC heating resistors.

10. A control method for operating a device for controlling a temperature of a neck region of a user of a vehicle seat, comprising the following steps:
conveying air to a temperature control region by means of an air conveying device; and
controlling by means of a temperature control device, of a temperature of the air conveyed to the temperature control region;
automatically controlling the air conveying device and the temperature control device by means of a control device,
wherein the control device is configured to adjust to a preheat operating mode upon activation of the device and/or when an ambient temperature is below a temperature threshold; in the preheat operating mode, the air conveying device is deactivated and the temperature control device is activated;
wherein the control device is configured to maintain the preheat operating mode for a duration of a preheating period and/or until a predefined difference between the ambient temperature and an air temperature of a temperature-controlled air is reached;
wherein the temperature control device comprises one or more PTC heating resistors, the control device is configured to determine the duration of the preheating period on a basis of:
i) a resistance value of the one or more PTC heating resistors, and/or
ii) a gradient of the resistance value of the one or more PTC heating resistors.

11. The control method according to claim 10, comprising at least one of the following steps:
automatically adjusting the device by means of the control device to a start-up operating mode, in which the air conveying device and the temperature control device are activated and an operating state of the air conveying device and/or the operating state of the temperature control device change(s) at least temporarily;
automatically adjusting the device by means of the control device to a continuous operating mode, in which the air conveying device and the temperature control device are operated substantially constantly in a desired state.

12. The control method according to claim 11, comprising at least one of the following steps:
activating the device;
detecting the ambient temperature;
wherein the preheat operating mode is set upon activation of the device and/or when the ambient temperature is below a temperature threshold.

13. The control method according to claim 11, comprising at least one of the following steps:
automatically switching from the preheat operating mode to the start-up operating mode once the preheating period has elapsed; and wherein the duration of the preheating period is determined on the basis of one or more ambient parameters and/or one or more operating parameters of the temperature control device.

14. The control method according to claim 10, wherein in a start-up operating mode, at least one of the following steps is carried out:
- adjustment of an electrical parameter that influences a conveyance rate of the air conveying device and/or a fluid flow;
- increasing the electrical parameter and/or the fluid flow from an initial value to a desired value, over a start-up time period;
- increasing the electrical parameter and/or the fluid flow linearly, hyperbolically or asymptotically, at least in stages;
- increasing the electrical parameter and/or the fluid flow on a basis of one or more ambient parameters, a temperature in the temperature control region and/or one or more operating parameters of the temperature control device.

15. The control method according to claim 10, wherein in a start-up operating mode, at least one of the following steps is carried out:
- detecting one or more ambient parameters;
- detecting the temperature control region;
- detecting one or more operating parameters of the temperature control device;
- wherein an influencing electrical parameter and/or a fluid flow is/are increased on the basis of the detected resistance value and/or the detected gradient of the resistance value.

16. The control method according to claim 10, wherein the control device is configured to determine the duration of the preheating period on the basis of both:
   i) the resistance value of the one or more PTC heating resistors, and ii) the gradient of the resistance value of the one or more PTC heating resistors.

* * * * *